(12) United States Patent
Woo et al.

(10) Patent No.: US 9,108,848 B2
(45) Date of Patent: Aug. 18, 2015

(54) METHODS OF MANUFACTURING AND TRANSFERRING LARGER-SIZED GRAPHENE

(75) Inventors: Yun-sung Woo, Suwon-si (KR); David Seo, Yongin-si (KR); Su-kang Bae, Suwon-si (KR); Sun-ae Seo, Hwaseong-si (KR); Hyun-jong Chung, Hwaseong-si (KR); Sae-ra Kang, Asan-si (KR); Jin-seong Heo, Suwon-si (KR); Myung-hee Jung, Seongnam-si (KR)

(73) Assignees: Samsung Electronics Co., Ltd., Gyeonggi-do (KR); Sungkyunkwan University Foundation For Corporate Collaboration, Gyeonggi-do (KR)

( * ) Notice: Subject to any disclaimer, the term of this patent is extended or adjusted under 35 U.S.C. 154(b) by 469 days.

(21) Appl. No.: 12/923,428

(22) Filed: Sep. 21, 2010

(65) Prior Publication Data
US 2011/0108521 A1    May 12, 2011

(30) Foreign Application Priority Data
Nov. 12, 2009    (KR) ................ 10-2009-0109283

(51) Int. Cl.
*H01L 21/302* (2006.01)
*H01L 21/461* (2006.01)
*C03C 15/00* (2006.01)
*C03C 25/68* (2006.01)
*C01B 31/02* (2006.01)
*B82Y 30/00* (2011.01)
*B82Y 40/00* (2011.01)

(52) U.S. Cl.
CPC ............. *C01B 31/0206* (2013.01); *B82Y 30/00* (2013.01); *B82Y 40/00* (2013.01); *Y10T 156/1041* (2015.01)

(58) Field of Classification Search
None
See application file for complete search history.

(56) References Cited

U.S. PATENT DOCUMENTS

| | | | |
|---|---|---|---|
| 6,702,970 B2 * | 3/2004 | Klug | 264/166 |
| 2001/0055854 A1 * | 12/2001 | Nishida et al. | 438/455 |
| 2004/0091711 A1 * | 5/2004 | Mukasa et al. | 428/408 |
| 2007/0187694 A1 | 8/2007 | Pfeiffer | |
| 2009/0068471 A1 * | 3/2009 | Choi et al. | 428/408 |
| 2009/0291270 A1 * | 11/2009 | Zettl et al. | 428/195.1 |
| 2010/0143726 A1 * | 6/2010 | Golzhouser et al. | 428/446 |

(Continued)

FOREIGN PATENT DOCUMENTS

| | | |
|---|---|---|
| JP | 2009-62247 | 3/2009 |
| JP | 2009-91174 | 4/2009 |

(Continued)

OTHER PUBLICATIONS

Reina et al, Transferring and Identification of Single and Few Layer Graphene on Arbitrary Substrates, Oct. 24, 2008, The Hournal of Physical Chemcistry C Letters, vol. 112, pp. 17741-17744.*

(Continued)

*Primary Examiner* — Stephanie Duclair
(74) *Attorney, Agent, or Firm* — Harness, Dickey & Pierce (57) ABSTRACT

Example embodiments relate to methods of manufacturing and transferring a larger-sized graphene layer. A method of transferring a larger-sized graphene layer may include forming a graphene layer, a protection layer, and an adhesive layer on a substrate and removing the substrate. The graphene layer may be disposed on a transferring substrate by sliding the graphene layer onto the transferring substrate.

16 Claims, 10 Drawing Sheets

(56) References Cited

U.S. PATENT DOCUMENTS

2011/0030879 A1* 2/2011 Veerasamy .................. 156/99
2011/0030991 A1* 2/2011 Veerasamy ............... 174/126.1

FOREIGN PATENT DOCUMENTS

| | | |
|---|---|---|
| JP | 2009-107921 A | 5/2009 |
| JP | 2011-006265 A | 1/2011 |
| KR | 10-2009-0026568 | 3/2009 |
| WO | WO 2009/035213 | 3/2009 |

OTHER PUBLICATIONS

Office Action issued in Chinese Patent Application No. 201010541911.7, dated Jan. 24, 2014 and English translation.

Japanese Office Action issued in Japanese Patent Application No. 2010-251597, dated Jun. 17, 2014.

X. Li et al., "Large-Area Synthesis of High-Quality and Uniform Graphene Films on Copper Foils", Science 324, (2009) pp. 2-9.

* cited by examiner

METHODS OF MANUFACTURING AND TRANSFERRING LARGER-SIZED GRAPHENE

CROSS-REFERENCE TO RELATED APPLICATION

This application claims priority under 35 U.S.C. §119 to Korean Patent Application No. 10-2009-0109283, filed on Nov. 12, 2009 with the Korean Intellectual Property Office, the disclosure of which is incorporated herein in its entirety by reference.

BACKGROUND

1. Field

The present disclosure relates to methods of manufacturing a larger-sized graphene layer and methods of transferring a larger-sized graphene layer onto a transferring substrate.

2. Description of the Related Art

Graphene is electrically, mechanically, and chemically stable and has relatively high conductivity. As a result, graphene has been highlighted as a basic material for use in an electric circuit. Graphene may be manufactured using chemical vapor deposition (CVD) or pyrolysis of a silicon carbide (SiC) substrate.

Wet etching may be performed to remove a substrate from graphene. However, with regard to a larger-sized graphene layer, wet etching begins from the edges thereof, thus requiring a relatively long period of time to etch to the center part thereof.

A stamp method may also be used to transfer a graphene layer. The stamp method may include attaching graphene onto a first substrate and transferring the attached graphene to another substrate, e.g., a transferring substrate. However, such a transferring method is not conducive to transferring a larger-sized graphene layer.

SUMMARY

Example embodiments relate to methods of manufacturing a larger-sized graphene layer and methods of transferring a larger-sized graphene layer to a transferring substrate. Additional aspects will be set forth herein, which may be apparent from the description or by practice of the non-limiting embodiments.

A method of transferring a larger-sized graphene layer may include forming a graphene layer on a substrate; forming a protection layer and an adhesive layer on the graphene layer; removing the substrate; disposing the graphene layer on a transferring substrate; and removing the adhesive layer and the protection layer. The method may further include forming a catalyst layer on the substrate prior to forming the graphene layer. The catalyst layer may include a material selected from the group consisting of nickel (Ni), iron (Fe), cobalt (Co), platinum (Pt), and ruthenium (Ru). The protection layer may include a material selected from the group consisting of poly methyl methacrylate (PMMA), photoresist (PR), electron resist (ER), $SiO_x$, and $AlO_x$. The adhesive layer may include a material selected from the group consisting of adhesive tape, glue, epoxy resin, thermal release tape, and water-soluble tape.

Removing the substrate may include weakening an adhesion between the catalyst layer and the substrate; and separating the substrate from the catalyst layer, the graphene layer, the protection layer, and the adhesive layer. Weakening the adhesion between the catalyst layer and the substrate may include penetrating a hydrophilic liquid into a gap between the catalyst layer and the substrate. The method may further include removing the catalyst layer after removing the substrate.

Disposing the graphene layer may include coating a contact solution on the transferring substrate; and sliding the graphene layer onto the transferring substrate. The contact solution may include a material selected from the group consisting of deionized water, isopropyl alcohol, ethanol, methanol, and mineral oil.

A method of manufacturing a larger-sized graphene layer may include forming a plurality of graphene layers on a plurality of substrates; forming a protection layer on each of the plurality of graphene layers; attaching an adhesive tape onto the protection layer; weakening an adhesion between the plurality of graphene layers and the plurality of substrates; and removing the plurality of substrates. The method may further include attaching a non-adhesive tape on the adhesive tape so as to cover the plurality of graphene layers; and winding the adhesive tape with the plurality of graphene layers onto a roll.

Another method of manufacturing a larger-sized graphene layer may include forming a graphene layer on a substrate; forming a protection layer and an adhesive layer on the graphene layer; cutting an exposed surface of the substrate to form a cutting line after forming the protection layer and the adhesive layer on the graphene layer; contacting a hydrophilic liquid to the cutting line; removing the substrate; and removing the adhesive layer and the protection layer.

BRIEF DESCRIPTION OF THE DRAWINGS

The above and/or other aspects of example embodiments may become more apparent and readily appreciated when the following description is taken in conjunction with the accompanying drawings of which.

DETAILED DESCRIPTION

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 1:
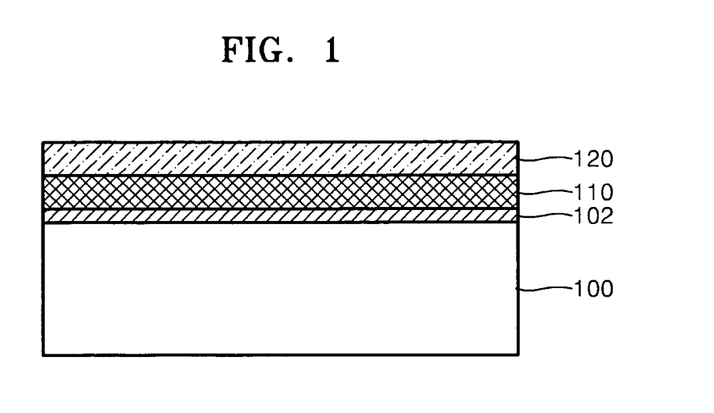
FIGS. 1-7 are cross-sectional views illustrating a method of manufacturing and transferring a larger-sized graphene layer according to example embodiments.

FIGS. 1-7 are cross-sectional views illustrating a method of manufacturing and transferring a larger-sized graphene layer according to example embodiments. Referring to FIG. 1, a catalyst layer 110 may be formed on a substrate 100. The substrate 100 may be formed of silicon so as to have a thickness of about 650 μm. A silicon oxide layer 102 having a thickness of about 100 nm to about 300 nm may be further formed on the substrate 100 by oxidizing the substrate 100 before forming the catalyst layer 110.

The catalyst layer 110 may be formed on the substrate 100 by sputtering at least one metal selected from the group consisting of nickel (Ni), iron (Fe), cobalt (Co), platinum (Pt), and ruthenium (Ru). The catalyst layer 110 may be formed to have a thickness of about 100 nm to about 150 nm. When graphene is formed by pyrolysis using a silicon carbide (SiC) substrate as the substrate 100, the catalyst layer 110 may be omitted from the substrate 100.

A graphene layer 120 may be formed on the catalyst layer 110. The graphene layer 120 may be formed by using a general chemical vapor deposition (CVD) with a carbon-containing source gas ($CH_4$, $C_2H_2$, $C_2H_4$, or CO). The graphene layer 120 may be a single layer or a multi-layer (e.g., bi-layer). The graphene layer 120 may be formed to have a thickness of about 0.3 nm to about 2 nm.

Figure 2:
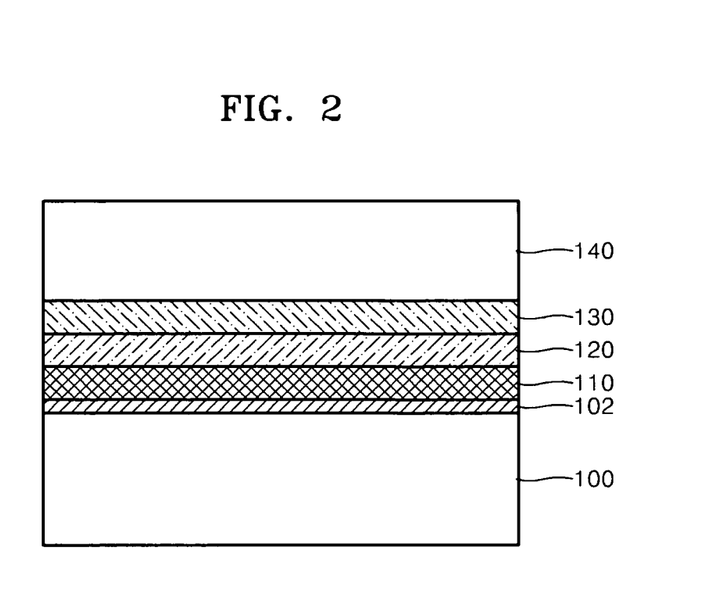

Referring to FIG. 2, a protection layer 130 may be formed on the graphene layer 120. The protection layer 130 may be used to protect the graphene layer 120 during subsequent manufacturing processes. The protection layer 130 may be formed by spin coating using at least one material selected from the group consisting of poly methyl methacrylate (PMMA), photoresist (PR), electron resist (ER), $SiO_x$, and $AlO_x$ and may have a thickness of about 200 nm to about 10 μm.

An adhesive layer 140 may be formed on the protection layer 130. The adhesive layer 140 may be formed to have a thickness of about 100 μm to about 200 μm by using at least one material selected from the group consisting of adhesive tape, glue, epoxy resin, thermal release tape, and water-soluble tape. As will be subsequently described in further detail, the adhesive layer 140 may be used to support the graphene layer 120 when the graphene layer 120 including the catalyst layer 110 is physically separated from the substrate 100.

Figure 3:
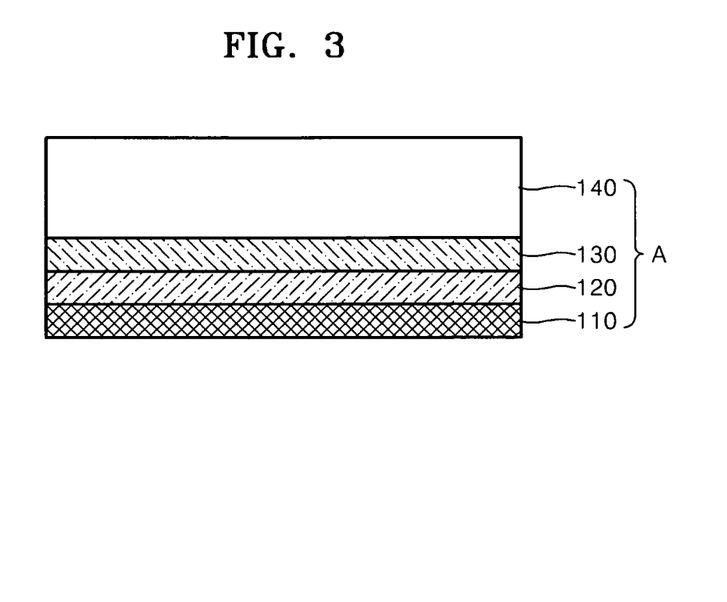
Figure 4:
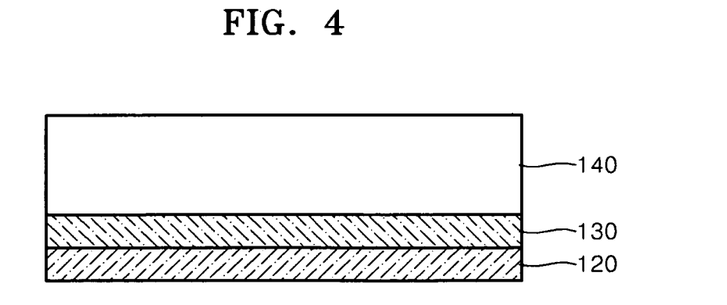

Referring to FIG. 3, the substrate 100 may be separated from the catalyst layer 110 to form an exfoliated layer A. When the substrate 100 is formed of silicon, a lower surface of the substrate 100 may be cut using a knife to form a cutting line. Alternatively, an edge of the substrate 100 may be removed so as to form a gap between the catalyst layer 110 and the substrate 100.

As a result, when a hydrophilic liquid contacts the cutting line or the gap between the catalyst layer 110 and the substrate 100, the hydrophilic liquid may penetrate the cutting line or the gap and weaken an adhesive strength between the substrate 100 and the catalyst layer 110 so as to facilitate separation of the substrate 100 from the catalyst layer 110. The hydrophilic liquid may be water, alcohol, and/or acetone, although example embodiments are not limited thereto. When the silicon oxide layer 102 is formed on the substrate 100, the adhesive strength between the catalyst layer 110 and the silicon oxide layer 102 may be relatively low. Thus, the substrate 100 including the silicon oxide layer 102 may be separated with relative ease from the catalyst layer 110.

The adhesive layer 140 may be lifted up so as to separate the catalyst layer 110 from the substrate 100. Alternatively, the substrate 100 may be directly removed by ion milling. In addition, the substrate 100 may be removed by using chemical etching. Depending on the material of the substrate 100, the etchant may be KOH, $FeCl_3$, HCl, HF, or a reactive ion etching etchant Referring to FIG. 4, the catalyst layer 110 may be removed from the exfoliated layer A of FIG. 3 by using wet etching. For example, the exfoliated layer A may be exposed to a mixture of $FeCl_3$, HCl, and water so as to remove the catalyst layer 110. Alternatively, the catalyst layer 110 may be removed by using reaction ion etching or ion milling. The resultant structure may be rinsed by using isophthalic acid (IPA) or deionized (DI) water.

Figure 5:
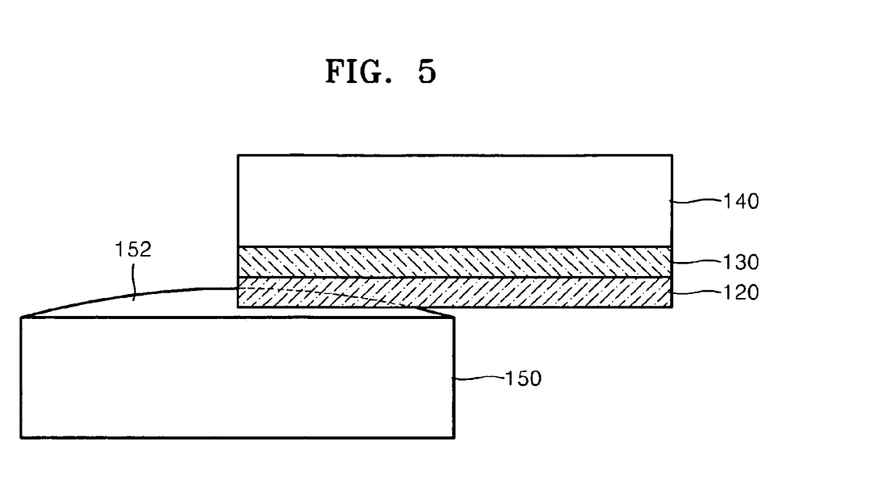
Figure 6:
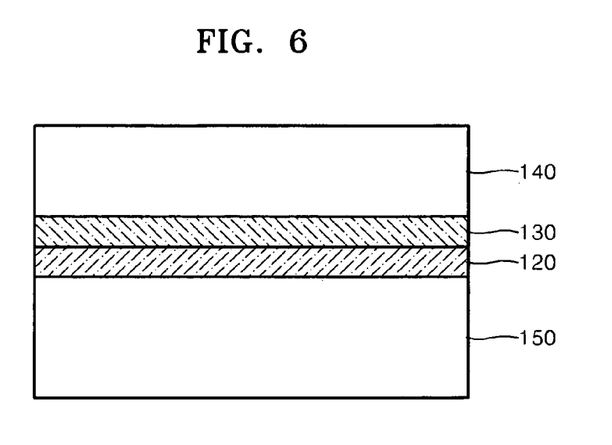

Referring to FIGS. 5 and 6, the resultant structure may be arranged on a transferring substrate 150 so that the graphene layer 120 contacts the transferring substrate 150. A contact solution 152 may be coated on the transferring substrate 150. At least one selected from the group consisting of deionized water, isopropyl alcohol, ethanol, methanol, and mineral oil may be used as the contact solution 152. The resultant structure may be aligned by sliding the resultant structure on the transferring substrate 150.

Alternatively, if the surface of the transferring substrate 150 has a hydrophobic property, then the contact solution 152 may be coated on the graphene layer 120 and the transferring substrate 150 may be arranged on the graphene layer 120. The transferring substrate 150 may be aligned by sliding the transferring substrate 150 on the graphene layer 120.

The contact solution 152 may be removed from the transferring substrate 150. For example, the transferring substrate 150 may be thermally treated at about 60° C. for about 6 hours so as to remove the contact solution 152.

Figure 7:
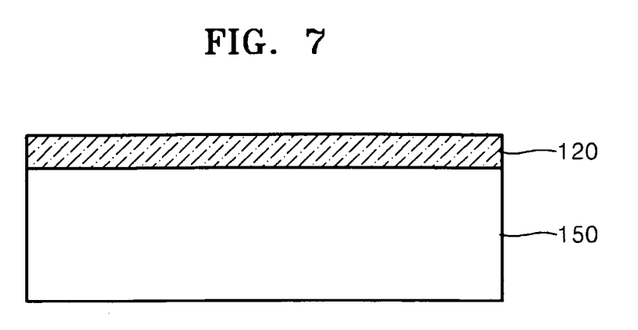

Referring to FIG. 7, the adhesive layer 140 and the protection layer 130 may be sequentially removed using etching, ion milling, and/or thermal treatment depending on the materials of the adhesive layer 140 and the protection layer 130. The etching, ion milling, and/or thermal treatment may be well-known processes. As a result, a detailed description in this regard has been omitted for brevity. The graphene layer 120 may be rinsed by using IPA or DI water so as to remove chemical residues from the graphene layer 120.

According to example embodiments, a larger-sized graphene layer having a size of about 6 inches or more may be transferred with relative ease to a transferring substrate having a size equal to or greater than the larger-sized graphene layer. Also, to remove a substrate on which the graphene layer has been formed, the substrate may be cut and a hydrophilic liquid may be introduced on the cut line so as to separate the substrate and the graphene layer.

FIGS. 8-13 are views schematically illustrating another method of manufacturing a larger-sized graphene layer according to example embodiments. As previously noted, like reference numerals denote like elements. Accordingly, a detailed explanation of elements already discussed above will not be repeated below for purposes of brevity.

Figure 8:
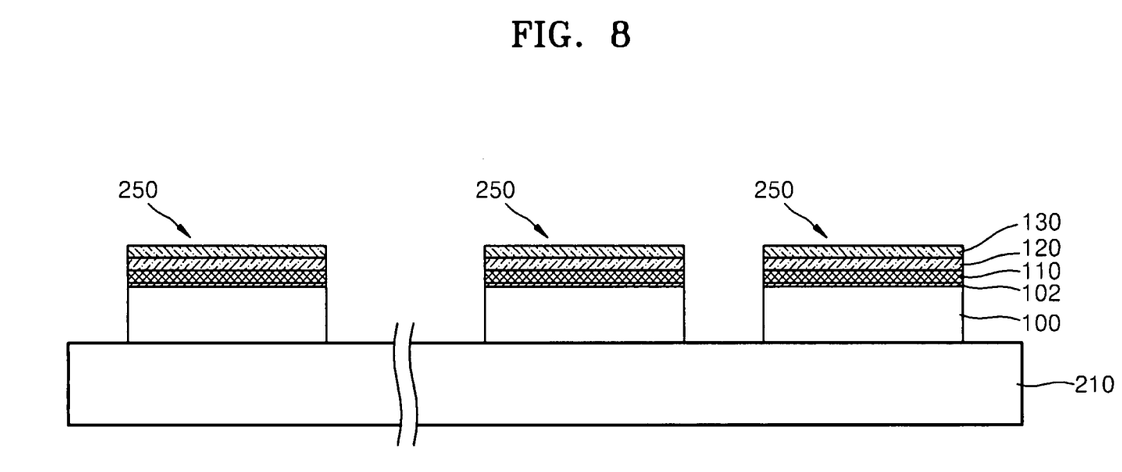
FIGS. 8-13 are views schematically illustrating another method of manufacturing larger-sized graphene according to example embodiments.

Referring to FIG. 8, a plurality of substrates 100 may be disposed on a substrate holder 210. The silicon oxide layer 102, the catalyst layer 110, the graphene layer 120, and the protection layer 130 may be sequentially formed on each substrate 100 so as to form a stack 250. The stack 250 may be formed as described in the previous non-limiting embodiment. Thus, a detailed description thereof has been omitted for brevity. In FIG. 8, the plurality of substrates 100 may be disposed on one substrate holder 210. However, example embodiments are not limited thereto and each of the plurality of substrates 100 may be disposed on a separate substrate holder (not illustrated).

Figure 9:
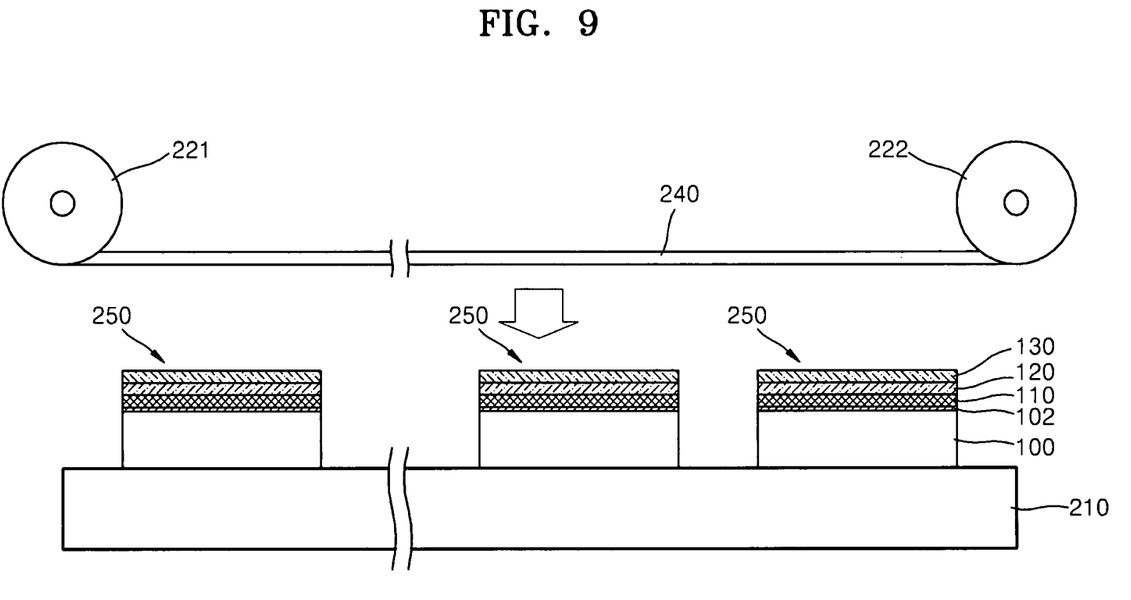

Referring to FIG. 9, an adhesive tape 240 may be adhered to the protection layer 130 disposed on the substrate holder 210. The adhesive tape 240 may be drawn out while being wound on a first roll 221 and may be adhered to a second roll 222. The first roll 221 and the second roll 222 may be lowered such that the adhesive tape 240 contacts the protection layer 130.

Figure 10:
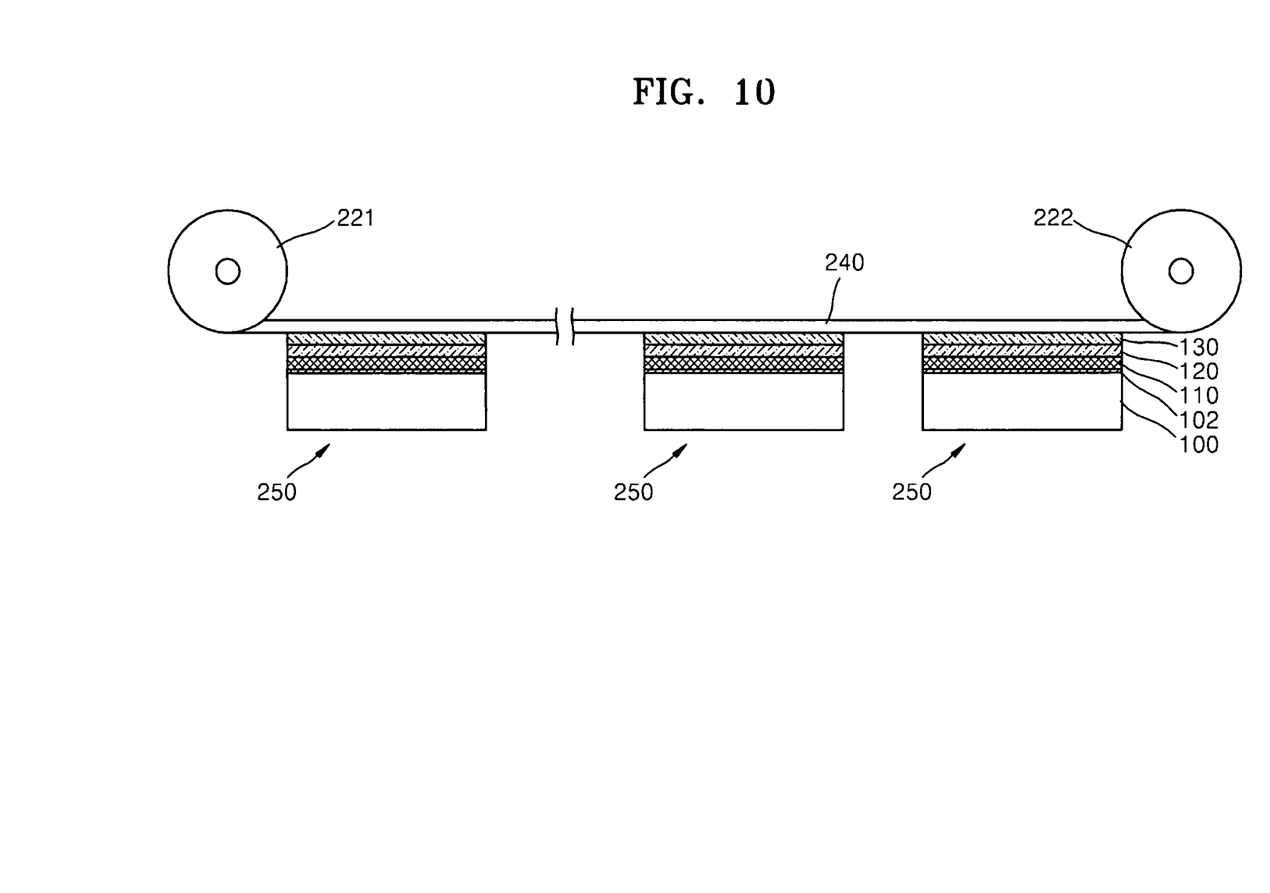

Referring to FIG. 10, while supported by the adhesive tape 240, the first roll 221, and the second roll 222, the stack 250 may separated from the substrate holder 210.

Figure 11:
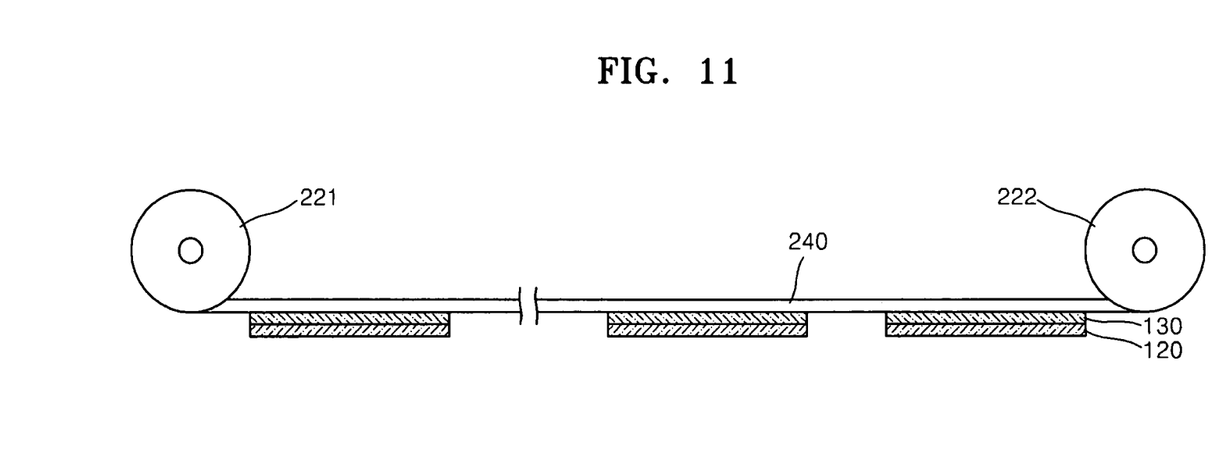

Referring to FIG. 11, a lower surface of the silicon substrate 100 may be cut to form a cutting line. Consequently, when a hydrophilic liquid contacts the cutting line, the hydrophilic liquid may penetrate the cutting line of the substrate 100 and facilitate the separation of the substrate 100 from the catalyst layer 110. The hydrophilic liquid may be water, alcohol, and/or acetone, although example embodiments are not limited thereto.

The adhesive tape 240 may be lifted up so as to separate the catalyst layer 110 from the substrate 100. When the silicon oxide layer 102 has been formed on the substrate 100, the substrate 100 and the silicon oxide layer 102 may be separated with relative ease from the catalyst layer 110, because the adhesive strength between the catalyst layer 110 and the silicon oxide layer 102 may be relatively low. Alternatively, the substrate 100 may be directly removed by ion milling. Also, the substrate 100 may be removed by using chemical etching. Depending on the material of the substrate 100, the etchant may be KOH, $FeCl_3$, HCl, HF, or a reactive ion etching etchant.

The catalyst layer 110 may be removed by wet etching. For example, when the catalyst layer 110 is formed of Ni or Cu, the catalyst layer 110 may be etched using $FeCl_3$. Alternatively, the catalyst layer 110 may be removed by using reaction ion etching, ion milling, and/or ashing.

Figure 12:
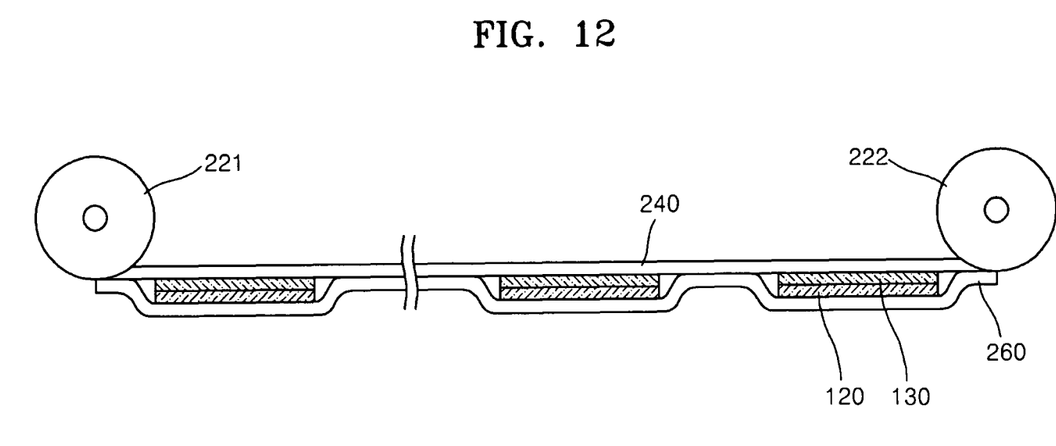

Referring to FIG. 12, a non-adhesive tape 260 may be adhered to the adhesive tape 240 so as to cover the graphene layer 120. The non-adhesive tape 260 may be drawn out from a roll (not illustrated) on which the non-adhesive tape 260 is wound and may be overlapped with the adhesive tape 240. The non-adhesive tape 260 may be a general cellophane adhesive tape, although example embodiments are not limited thereto.

Figure 13:
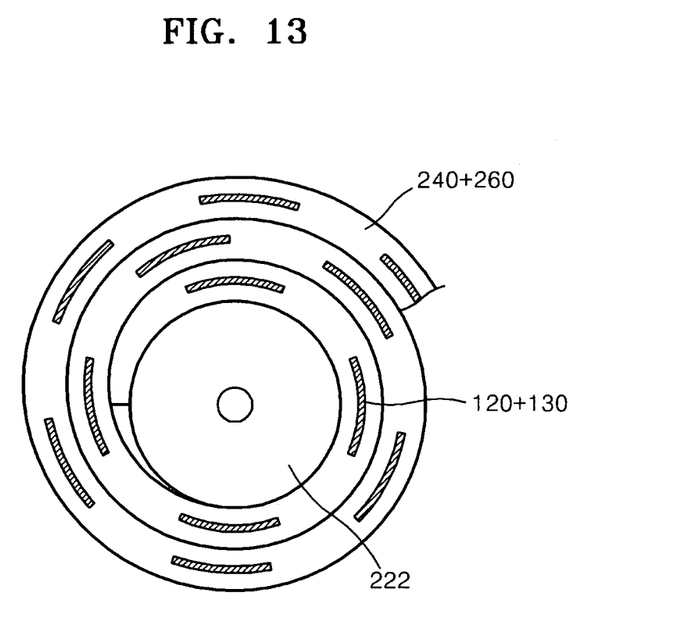

Referring to FIG. 13, the plurality of graphene layers 120 including the corresponding protection layers 130 may be wounded onto the second roll 222 and stored. Thus, the stored graphene layers 120 may be used at a later time as needed. In FIG. 13, it should be understood that the graphene layer 120, the protection layer 130, the adhesive tape 240, and the non-adhesive tape 260 have been schematically illustrated.

In a non-limiting embodiment, a plurality of larger-sized graphene layers having a size of about 6 inches or more may be wound on a roll and stored, and if necessary, the larger-sized graphene layers may be cut prior to use. As described above, a larger-sized graphene layer may be separated with relative ease from the catalyst layer and stored. In a method of transferring a larger-sized graphene layer according to example embodiments, the larger-sized graphene layer may be transferred with relative ease onto a transferring substrate.

While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

What is claimed is:

1. A method of transferring a larger-sized graphene, comprising:
    forming a graphene layer on a substrate;
    sequentially forming a protection layer and an adhesive layer on the graphene layer;
    removing the substrate;
    disposing the graphene layer on a transferring substrate with a contact solution layer; and
    removing the adhesive layer and the protection layer,
    wherein the disposing includes coating the contact solution layer on a surface of the transferring substrate, the surface facing the graphene layer; and sliding the graphene layer onto the transferring substrate via the contact solution layer.

2. The method of claim 1, further comprising:
    forming a catalyst layer on the substrate prior to forming the graphene layer.

3. The method of claim 2, wherein removing the substrate includes:
  weakening an adhesion between the catalyst layer and the substrate; and
  separating the substrate from the catalyst layer, the graphene layer, the protection layer, and the adhesive layer.

4. The method of claim 3, wherein weakening the adhesion between the catalyst layer and the substrate includes penetrating a hydrophilic liquid into a gap between the catalyst layer and the substrate.

5. The method of claim 2, further comprising:
  removing the catalyst layer after removing the substrate.

6. The method of claim 1, wherein the protection layer includes a material selected from the group consisting of poly methyl methacrylate (PMMA), photoresist (PR), electron resist (ER), $SiO_x$, and $AlO_x$.

7. The method of claim 1, wherein the adhesive layer includes a material selected from the group consisting of adhesive tape, glue, epoxy resin, thermal release tape, and water-soluble tape.

8. The method of claim 1, wherein removing the substrate includes etching the substrate.

9. The method of claim 1, wherein the contact solution layer includes a material selected from the group consisting of deionized water, isopropyl alcohol, ethanol, methanol, and mineral oil.

10. The method of claim 1, further comprising:
  evaporating the contact solution layer by heating the transferring substrate.

11. The method of claim 1, further comprising:
  cutting an exposed surface of the substrate to form a cutting line after forming the protection layer and the adhesive layer on the graphene layer; and
  contacting a hydrophilic liquid to the cutting line.

12. The method of claim 11, further comprising:
  forming a catalyst layer on the substrate prior to forming the graphene layer; and
  removing the catalyst layer after removing the substrate.

13. The method of claim 11, wherein the adhesive layer includes a material selected from the group consisting of adhesive tape, glue, epoxy resin, thermal release tape, and water-soluble tape.

14. The method of claim 1, wherein the graphene layer is formed on the substrate by chemical vapor deposition.

15. The method of claim 1, wherein a majority of an upper surface of the transferring substrate is coated with the contact solution layer.

16. The method of claim 1, wherein the graphene layer contacts the contact solution layer on the transferring substrate before contacting the transferring substrate.

* * * * *